(12) United States Patent
Krueger

(10) Patent No.: US 6,372,363 B1
(45) Date of Patent: Apr. 16, 2002

(54) METHOD OF IMPROVING AND OPTIMIZING THE HYDROGEN PERMEABILITY OF A PALLADIUM-COPPER MEMBRANE AND NOVEL MEMBRANES MANUFACTURED THEREBY

(75) Inventor: Charles Krueger, Cambridge, MA (US)

(73) Assignee: Walter Juda Associates, Inc., Needham, MA (US)

( * ) Notice: Subject to any disclaimer, the term of this patent is extended or adjusted under 35 U.S.C. 154(b) by 0 days.

(21) Appl. No.: 09/556,421

(22) Filed: Apr. 24, 2000

(51) Int. Cl.$^7$ .................. B01D 71/02; C22F 1/14
(52) U.S. Cl. .............. 428/606; 148/430; 148/678; 55/522; 95/56; 96/4
(58) Field of Search .................. 428/606, 613; 55/522; 95/56; 96/4; 148/430, 678

(56) References Cited

U.S. PATENT DOCUMENTS

| | | | | |
|---|---|---|---|---|
| 3,350,845 A | * | 11/1967 | McKinley | 95/56 |
| 3,713,270 A | * | 1/1973 | Farr et al. | 95/56 |
| 4,063,937 A | * | 12/1977 | Goltsov et al. | 95/56 |
| 4,080,224 A | * | 3/1978 | Goltsov et al. | 148/430 |
| 5,908,812 A | * | 6/1999 | Cotton et al. | 505/230 |
| 5,997,594 A | * | 12/1999 | Edlund et al. | 95/56 |

* cited by examiner

Primary Examiner—John J. Zimmerman
(74) Attorney, Agent, or Firm—Rines and Rines

(57) ABSTRACT

Novel heat treatment techniques for improving and optimizing the hydrogen permeability of thin palladium-copper alloy foil membranes and, in particular, Pd/40%Cu alloy membranes.

4 Claims, No Drawings

METHOD OF IMPROVING AND OPTIMIZING THE HYDROGEN PERMEABILITY OF A PALLADIUM-COPPER MEMBRANE AND NOVEL MEMBRANES MANUFACTURED THEREBY

FIELD OF THE INVENTION

This invention relates to hydrogen-permeable palladium-copper alloy membranes and the like; being more particularly concerned with manufacturing techniques for insuring the production of consistent and optimized permeation rates of hydrogen through such palladium-copper membranes and, in particular in connection with preferred alloy compositions consisting of about 60% by weight of palladium and about 40 percent by weight of copper; and more specifically to thinned such membranes in planar foil form with a copper content between 36 and 42% (herein referred to as Pd/40%Cu).

BACKGROUND OF INVENTION

Uses and advantages of such Pd/40%Cu membranes for hydrogen permeation have been pointed out in U.S. Pat. No. 5,904,754, and in patent application Ser. Nos. 08/719,385 and 09/252,302, of common assignee, incorporated herein by reference.

In securing from manufacturers different production samples of such membrane foils made from billets by mechanical rolling techniques, it has been undesirable variability for membrane production purposes.

It is well-known in the art, as shown in the above-referenced patent and patent applications, that the Pd/40%Cu membrane exhibits a sharp maximum in hydrogen permeation as a function of composition in the neighborhood of 40% copper. Even small departures from the optimum substantially 40% composition (herein in the range of about 36–42%Cu) causes significant flux losses, as depicted, for example, in FIG. 8, p. 1042 of the publication by Shu et al. in the Canadian Journal of Chemical Engineering, 69 (1991). Specifically, the optimum alloy membrane is seven times more permeable than an alloy with 45% copper; and, with an alloy of 30% copper, the permeation is even more drastically reduced to almost one tenth In metallurgy, it is well-known that inter-granular non-uniformities can occur during solidification; their formation being a phenomenon known as "coring". Coring is associated with solidification of alloys and is due to non-ideal freezing of the melt into a solid phase, which differs in composition from the initial melt. In the case of a binary alloy which forms a continuous solid solution, the solid phase will initially be rich in the higher melting temperature constituent or compound; solidification proceeding via the mechanism of grain growth and with the melt being selectively depleted of it The final metal structure consists of a collection of grains, each grain being richer in the higher melting component in the center (the initial solids) and poorer at the outer edges (the final solids). The actual extent of coring is known to depend on a number of factors, chief among them, the rate of solidification and cooling of the solid: faster solidification and cooling tending to form more highly cored structures. In addition to coring, faster solidification and cooling also lead to smaller-sized grains.

To "homogenize" the alloys from cored structures, that is to produce alloys of uniform composition throughout, heat treatment is used. It can be applied to the billet just after solidification or, alternatively, to a foil formed by mechanical pressure-rolling of the billet. In the latter case, the times required to attain homogenization are typically much shorter due to the deformation of the grains that occurs during rolling and the correspondingly smaller distances over which solid state diffusion must occur. This has been reported for nickel/copper alloys, for example, in Metals Handbook, Principles of Heat Treatment of Nonferrous Alloys, C. R. Brooks; Ed's H. E. Boyer and T. L. Gall, American Society for Metals, Metals Park Ohio, 1985. In the case of a nickel, (30%) copper alloy, the time required for homogenization for a cast billet was six hours at 1000° C., as compared with one hour for the billet rolled to one-half thickness. Grain growth and homogenization, indeed, occur simultaneously.

While not wishing to be bound by any particular theory, it being sufficient to describe the conditions found to be required to attain the results of the invention, it is believed that the observed variability of the fluxes in commercially produced Pd/40%Cu foils, as received, may be attributable to the formation of more or less cored billets. In accordance with this view, underlying the invention is the discovery that critical conditions of solidification and heat treatment, specifically pertaining to the preferred Pd/40%Cu alloy foils, have insured both reproducibility and optimization of the flux therethrough, while retaining strength and avoiding pin holes. Preferably, though not always necessarily, mechanical rolling prior to homogenization allows reaching fully uniform alloys in sufficiently short periods to prevent deleterious excessive grain growth. Alternately, however, homogenization of billets is also beneficial when conditions, such as rapid melt solidification, result in small grain sizes of the billet.

OBJECTS OF THE INVENTION

An object of the present invention, accordingly, is to provide new and improved methods for manufacturing palladium-copper membranes of consistently uniform composition and of optimized hydrogen permeability, and improved membranes resulting therefrom.

A further object of optimum and consistent permeability is to provide improved techniques for producing thin Pd/40%Cu foil membranes.

Other and further objects will be explained hereinafter and are more particularly defined in the appended claims.

SUMMARY OF THE INVENTION

In summary, the invention embraces the methods of subjecting preferably a solid Pd/40%Cu alloy billet, made by freezing a melt of said composition, to a heat treatment at a temperature less than the melting point of the alloy for a critical finite time period, and forming therefrom a thin foil membrane by mechanical pressure-rolling of said billet; and, alternately, making said thin membrane from the unheated billet and subjecting this foil, whether or not further membrane from the unheated billet and subjecting this foil, whether or not further thinned by chemical or electrochemical means, to a heat treatment at a temperature of less than 100° C. below its melting point for a period of not less than about 10 minutes and not more than about 60 minutes (one hour).

Preferred and best-mode techniques are hereinafter explained in detail.

DESCRIPTION OF PREFERRED EMBODIMENT(S) OF THE INVENTION

Over a period of about a year, six lots of the previously described preferred Pd/40%Cu foil membranes have been received from one producer. Samples from these lots have been examined and found to be pin hole-free and of good mechanical quality, and also of substantially equal thickness (about 0.001"). They have then submitted to the following flux measurements and tests.

The membranes are held in a test apparatus comprising a high pressure chamber connected to a low pressure chamber by the membrane. Hydrogen is flowed at 350° C. through the high pressure chamber at a pressure of 50 psig, causing hydrogen permeation through the membrane into the low pressure chamber, where the hydrogen is kept at ambient pressure. The hydrogen product flowing out of the low pressure chamber is cooled and its flow rate is measured in a bubble flow meter at room temperature. The hydrogen flux is then determined from the measured flow rate, in standard cubic centimeters per minute, by dividing by the membrane area, in square centimeters, scc/cm>2-min.

Fluxes of samples from the six lots received ranged from ca. 20 to ca. 30 scc/cm>2-min, obviously an unacceptable variability.

To test the efficacy of the invention, the worst of the lots were chosen, (flux=20) for upgrading.

EXAMPLE 1 (CONTROL)

A sample of this lot was heat-treated in an inert, i.e. non-oxidizing and preferably mildly reducing atmosphere of nitrogen containing 2% hydrogen at 900° C. for 15 hours. Result No flux improvement

EXAMPLE 2

Same atmosphere as in Example 1, temperature: 1050° C. for 20 minutes. Flux improvement to 25.6 scc/cm<2-min.

EXAMPLE 3

Same atmosphere as in Example 1, temperature: 1100° C. for 20 minutes. Flux improvement to 27.2 scc/cm<2-min.

EXAMPLE 4

Same atmosphere as in Example 1, temperature: 1100° C. for 40 minutes. Flux improvement spectacular to 32.8 scc/cm<2-min.

It should be noted that the last flux (32.8) exceeds the highest flux (30) of the lots "as received", i.e. not heat-treated.

Similar treatments were given to samples of the other lots which consistently showed that the homogenizing temperature must not be less than about 100° C. below the alloy's melting point (ca. 1190° C.), and that the more easily homogenized foils (as distinguished from billets) require exposure for at least about 10 minutes, but not more than about an hour. It has been found that longer exposures, indeed, weaken the membranes mechanically and cause pinholes, hence rendering the membranes practically useless.

When Pd/40%Cu billets are made by freezing melts of this alloy and when they are subjected to the above-described heat treatments before mechanical thinning, longer heat treatment times, often double or more, are required than in the case of foils. The billets are not only much thicker, but they are also more variable in grain size depending on the melt freezing conditions.

It has also been found that the heating conditions of flux enhancement are substantially the same for ordinary mechanically thinned foils and for foils subjected to further thinning by chemical or electrochemical techniques as described in, for example, said co-pending patent application Ser. No. 09/252,302, now U.S. Pat. No. 6,108,028, in the range of from about 0.001"–0.003" of the former, to as low as about 0.0001–0.0004" of the latter.

In summary, the fabricating method steps of the invention minimize grain size of palladium-copper alloy foils, and ensure mechanical integrity of the membrane for hydrogen purification uses and the like, preventing large grain sizes that cause the formation of pinholes along grain boundaries. Minimizing grain size is not only particularly important for the preferred rolled Pd/40% Cu foils, moreover, but such becomes critical when the membranes are further thinned, as by the above-described chemical or electrochemical techniques.

Further modifications will occur to those skilled in this art and such are considered to fall within the spirit and scope of the invention as defined in the appended claims.

What is claimed is:

1. A method of reproducibly manufacturing thin Pd/40%Cu alloy foils of controlled optimized hydrogen permeability, comprising the steps of making a Pd/40%Cu billet by freezing a melt of that composition; forming a thin foil by mechanically pressure-rolling the heated billet; and subjecting said thin foil in an inert gaseous atmosphere to a temperature of less than about 100° C. below the melting point of the alloy for a period of not less than about 10 minutes and not more than about an hour.

2. An optimized hydrogen-permeability Pd/40%Cu foil manufactured by the method of claim 1.

3. The foil of claim 2 wherein the foil has a thickness between about 0.0001" and 0.0004".

4. A method of reproducibly manufacturing thin palladium copper-alloy foil membranes of controlled optimized hydrogen permeability from palladium copper alloy billets formed by freezing a melt of the palladium copper composition, that comprises the steps of mechanically pressure rolling of the billet into said foil membrane and subjecting it in an inert gaseous atmosphere at a temperature of less than about 100° C. below the melting point of the alloy for a finite period of time sufficient to ensure substantial uniformity in the foil membrane without causing pinholes, and wherein said membrane is a Pd/40%/Cu by weight alloy foil and said finite period of time is not less than about ten minutes and not more than about one hour.

* * * * *